(12) United States Patent
Aughey

(10) Patent No.: US 10,086,955 B2
(45) Date of Patent: Oct. 2, 2018

(54) PATTERN-BASED CAMERA POSE ESTIMATION SYSTEM

(71) Applicant: THE BOEING COMPANY, Huntington Beach, CA (US)

(72) Inventor: John H. Aughey, Richmond Heights, MO (US)

(73) Assignee: The Boeing Company, Chicago, IL (US)

( * ) Notice: Subject to any disclaimer, the term of this patent is extended or adjusted under 35 U.S.C. 154(b) by 286 days.

(21) Appl. No.: 14/921,453

(22) Filed: Oct. 23, 2015

(65) Prior Publication Data

US 2017/0116723 A1    Apr. 27, 2017

(51) Int. Cl.
| | |
|---|---|
| *H04N 13/00* | (2018.01) |
| *B64D 47/08* | (2006.01) |
| *G06K 9/00* | (2006.01) |
| *G06F 17/30* | (2006.01) |
| *B64C 39/02* | (2006.01) |
| *G06T 7/70* | (2017.01) |
| *G06K 9/62* | (2006.01) |

(52) U.S. Cl.
CPC ............ *B64D 47/08* (2013.01); *B64C 39/024* (2013.01); *G06F 17/30256* (2013.01); *G06F 17/30277* (2013.01); *G06K 9/0063* (2013.01); *G06K 9/6211* (2013.01); *G06T 7/70* (2017.01); *B64C 2201/127* (2013.01); *G06T 2207/30244* (2013.01)

(58) Field of Classification Search
USPC ...................................... 348/39–61, 135–140
See application file for complete search history.

(56) References Cited

U.S. PATENT DOCUMENTS

| | | | | |
|---|---|---|---|---|
| 2010/0232727 | A1* | 9/2010 | Engedal | H04N 13/0203 382/285 |
| 2010/0322522 | A1* | 12/2010 | Wang | G06K 9/00704 382/218 |
| 2014/0092132 | A1* | 4/2014 | Issa | G06T 19/006 345/633 |
| 2014/0340489 | A1* | 11/2014 | Medioni | G06K 9/46 348/50 |
| 2016/0173850 | A1* | 6/2016 | Zhang | G09B 29/005 348/43 |

* cited by examiner

*Primary Examiner* — Andy Rao
(74) *Attorney, Agent, or Firm* — Womble Bond Dickinson (US) LLP

(57) ABSTRACT

A camera pose estimation system is provided for estimating the position of a camera within an environment. The system may be configured to receive a 2D image captured by a camera within the environment, and interpret metadata of the 2D image to identify an estimated position of the camera. A synthetic 2D image from a 3D model of the environment may be rendered by a synthetic camera within the model at the estimated position. A correlation between the 2D image and synthetic 2D image may identify a 2D point of correlation, and the system may project a line from the synthetic camera through the 2D point on the synthetic 2D image rendered in an image plane of the synthetic camera such that the line intersects the 3D model at a corresponding 3D point therein. A refined position may be determined based on the 2D point and corresponding 3D point.

21 Claims, 8 Drawing Sheets

PATTERN-BASED CAMERA POSE ESTIMATION SYSTEM

TECHNOLOGICAL FIELD

The present disclosure relates generally to estimating a pose of a camera and, in particular, to determining the estimated pose of the camera using pattern matching.

BACKGROUND

During aerial video and/or image registration to a known three-dimensional (3D) scene, an aircraft vehicle is flown over a location and a live video feed or still images are captured of an environment. By determining the pose of the camera (e.g., where the camera was pointed) at the time the images where captured, the individual frames of the video feed or the still images can then be projected onto a 3D terrain within a virtual world to depict a visualization of the ground as imaged from the perspective of the aircraft vehicle.

A camera pose typically defines the position and orientation of a camera within an environment. In some instances, the camera position can be determined through a hardware camera tracking system in which a magnetic and/or optical tracker is placed on the camera and the camera's position in space is subsequently tracked. However, the determined position is only an estimate of the actual location of the camera. In particular, the position and orientation data may be erroneous due to low frequency sampling, interferences, and the like. As a result, during the video and image registration, the images are only projected in a nearby vicinity of where the actual objects (e.g., buildings, roads, cars, and the like) were located, and the projected image may not correlate with the reference 3D scene.

In other instances, the camera pose can be computed from the live video feed and/or images taken by the camera using known locations of objects that the camera is imaging along with the two-dimensional (2D) location of the objects in the captured image. Various algorithms can compute both intrinsic properties (e.g., focal length of a lens, image size, radial distortion, and other optical properties) and extrinsic properties (e.g., position and orientation) of the camera within six degrees of freedom of the camera in space, given adequate correlation points. Traditionally, techniques for determining the position and orientation of a camera, at the time an image was captured, require a minimum number of three-dimensional (3D) and two-dimensional (2D) correlations to compute a complete camera pose. For example, an algorithm for determining a camera pose may typically require at least six (6) to eleven (11) correlations for performing calculations to derive an accurate position of the camera. However, many times, the required number of points of correlation may be unavailable, resulting in the algorithm being unable to determine the position of the camera.

Therefore, it may be desirable to have a system and method that provides optimal estimation of a camera pose given limited information about how the 3D world relates to the 2D image captured by the camera.

BRIEF SUMMARY

Example implementations of the present disclosure are directed to an improved apparatus, method and computer-readable storage medium for estimating a position of a camera within an environment. The present disclosure includes, without limitation, the following example implementations.

In some example implementations, a method is provided for estimating a position of a camera within an environment. The method may comprise receiving a two-dimensional (2D) image captured by a camera within an environment. The 2D image may have corresponding metadata with structured information indicating an estimated position of the camera within the environment. The method may also comprise interpreting the metadata to identify the estimated position of the camera, and rendering a synthetic 2D image from a three-dimensional (3D) model of the environment. The synthetic 2D image may be rendered by a synthetic camera within the 3D model at the estimated position. The method may also comprise correlating the 2D image and synthetic 2D image to identify a 2D point on the synthetic 2D image that is a point of correlation. The method may also comprise projecting a line from the synthetic camera and through the 2D point on the synthetic 2D image rendered in an image plane of the synthetic camera in which the line intersects the 3D model at a corresponding 3D point therein. The method may also comprise determining a refined position of the camera, based at least in part on the 2D point and corresponding 3D point.

In some example implementations of the method of the preceding or any subsequent example implementation, or any combination thereof, the point of correlation includes a point on an object depicted in the 2D image and the synthetic 2D image, and correlating the 2D image and synthetic 2D image includes comparing the 2D image and the synthetic 2D image, and using the comparison, identifying the point of correlation based on a scale-invariant feature transform (SIFT) algorithm, speeded up robust features (SURF) algorithm, pattern matching algorithm, or optical flow algorithm.

In some example implementations of the method of any preceding or any subsequent example implementation, or any combination thereof, correlating the 2D image and synthetic 2D image includes identifying a plurality of 2D points on the synthetic 2D image that have at least a threshold degree of accuracy with respective corresponding 2D points on the 2D image, and that are thereby a plurality of points of correlation, and projecting the line includes projecting a respective plurality of lines from the synthetic camera and through the plurality of 2D points, the respective plurality of lines intersecting the 3D model at a corresponding plurality of 3D points therein.

In some example implementations of the method of any preceding or any subsequent example implementation, or any combination thereof, determining the refined position of the camera includes determining the refined position of the camera based at least in part on the plurality of 2D points and corresponding plurality of 3D points, according to at least one of a pose from an orthography and scaling with iterations (POSIT) algorithm, or a direct linear transformation algorithm.

In some example implementations of the method of any preceding or any subsequent example implementation, or any combination thereof, receiving the 2D image includes receiving the 2D image captured by the camera mounted onto an unmanned aerial vehicle (UAV), and rendering the synthetic 2D image includes rendering the synthetic 2D image by a synthetic UAV within the 3D model and including the synthetic camera.

In some example implementations of the method of any preceding or any subsequent example implementation, or any combination thereof, the 2D image includes a photograph or a frame of a live video feed, and the 3D model includes satellite imagery, an elevation map, or any known 3D feature data.

In some example implementations of the method of any preceding or any subsequent example implementation, or any combination thereof, the method further comprises overlaying the 2D image onto at least a portion of the 3D model.

In some example implementations, an apparatus is provided for estimating a position of a camera within an environment. The apparatus may include implementation of subsystems, such as an imaging engine, inference engine, rendering engine, registration engine, correlation engine, projection engine, estimation engine, and error calculator configured to perform steps of the method.

In some example implementations, a computer-readable storage medium is provided for estimating a position of a camera within an environment. The computer-readable storage medium is non-transitory and has computer-readable program code portions stored therein that, in response to execution by a processor, cause an apparatus to at least perform the method of any preceding example implementation, or any combination thereof.

These and other features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as intended, namely to be combinable, unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Figure 1:
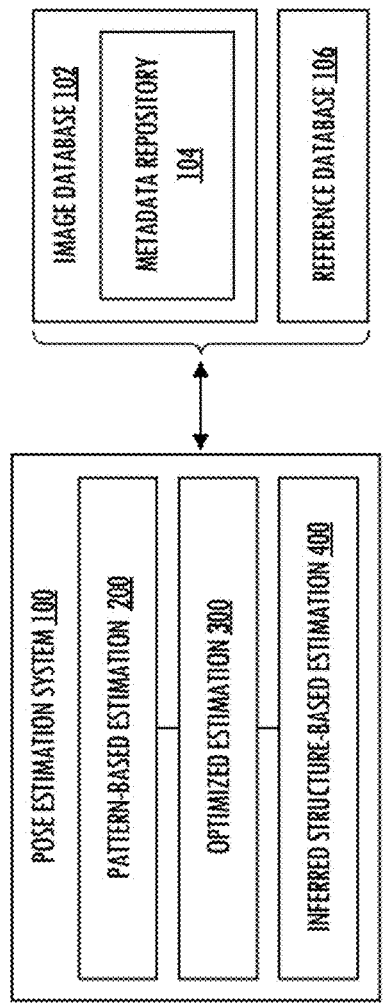
FIG. 1 is an illustration of a camera pose estimation system in accordance with an example implementation.

Some implementations of the present disclosure will now be described more fully hereinafter with reference to the accompanying drawings, in which some, but not all implementations of the disclosure are shown. Indeed, various implementations of the disclosure may be embodied in many different forms and should not be construed as limited to the implementations set forth herein; rather, these example implementations are provided so that this disclosure will be thorough and complete, and will fully convey the scope of the disclosure to those skilled in the art. For example, unless otherwise indicated, reference something as being a first, second or the like should not be construed to imply a particular order. Also, something may be described as being above something else (unless otherwise indicated) may instead be below, and vice versa; and similarly, something described as being to the left of something else may instead be to the right, and vice versa. Like reference numerals refer to like elements throughout.

Example implementations of the present disclosure are generally directed to estimating a position of a camera and, in particular, to determining and/or refining an estimated position of the camera in an undetermined system using various techniques such as pattern matching, inferred structure generation, and the like. As described herein, the position of a camera may refer to its coordinate position, angular position (orientation), or combination of its coordinate position and angular position in which a camera position may be defined by the combination of the coordinate position and angular position.

FIG. 1 illustrates a camera position estimation system 100 according to example implementations of the present disclosure. The camera position estimation system may include one or more of each of a number of subsystems and/or resource host system (each an individual system) such as, for example, an image database 102 having a metadata repository 104 therein, a reference database 106, a pattern-based pose estimation system 200, an optimized pose estimation system 300, and an inferred structure-based estimation system 400. Although being shown as part of the camera position estimation system, one or more of the pattern-based pose estimation system, optimized pose estimation system or inferred structure-based estimation system may instead be separate from but in communication with the camera position estimation system. It should also be understood that one or more of the subsystems may function or operate as a separate system without regard to others of the subsystems. And further, it should be understood that the camera position estimation system may include one or more additional or alternative subsystems than those shown in FIG. 1.

The pattern-based pose estimation system 200 may be generally configured to determine an estimated camera position using pattern matching. The pattern-based pose estimation system may be configured to receive a two-dimensional (2D) image captured by a camera within an environment. The 2D image may have corresponding metadata with structured information that indicates an estimated position of the camera within the environment. The metadata may be interpreted identify the estimated position of the camera, and render a synthetic 2D image from a 3D model of the environment in which the synthetic 2D image may be rendered by a synthetic camera within the 3D model at the estimated position. A correlation between the 2D image and synthetic 2D image may further identify a 2D point on the synthetic 2D image that is a point of correlation such that a line is projected from the synthetic camera and through the 2D point on the synthetic 2D image rendered in an image plane of the synthetic camera. The line may intersect the 3D model at a corresponding 3D point therein, and the system may determine a refined position of the camera based at least in part on the 2D point and corresponding 3D point.

The optimized pose estimation system 300 may be generally configured to determine an estimated camera position using optimized pose refinement. The optimized pose estimation system may receive a 2D image captured at a particular time by a camera within an environment. The 2D image may have corresponding metadata with structured information that indicates an estimated position of the camera within the environment. The metadata may be interpreted identify the estimated position of the camera, and the 2D image may be registered within a 3D model of the environment based thereon. The 2D image may be rendered in an image plane of a synthetic camera within the 3D model at the estimated position. A 2D point on the 2D image that has a corresponding 3D point in the 3D model may be identified. The synthetic camera and thereby the image plane and 2D image may be repositioned to a new position of the synthetic camera at which a projection line from the synthetic camera and through the 2D point intersects the corresponding 3D point. The new position of the synthetic camera may then be output as a refined position of the camera.

The structure-based pose estimation system 400 may be generally configured to receive a 2D image of at least a portion of a structure captured by a camera, and produce an annotated 2D image in which a plurality of architecture features of the structure in the 2D image are overlaid with a corresponding plurality of geometric features. The system may position a synthetic camera at a particular position, and by the synthetic camera render a synthetic 2D image of at least a portion of a 3D model of the structure. An amount of error in the particular position of the synthetic camera based on the annotated 2D image and synthetic 2D image may be calculated, including a correlation of the corresponding plurality of geometric features in the annotated 2D image, and a second plurality of geometric features of the 3D model of the structure in the synthetic 2D image. In each instance in which the amount of error is greater than a threshold amount of error, the synthetic camera may be repositioned and the synthetic 2D image may be rerendered by the camera, and the amount of error in the particular position of the synthetic camera may be recalculated. In an instance in which the amount of error is no greater than the threshold amount of error, the particular position of the synthetic camera may be output as a refined position of the camera.

As shown in FIG. 1, the camera pose estimation system 100 may include and/or be coupled to one or more resource host systems. Examples of suitable resource host systems may generally include software-based systems and appropriate storage accessible by an electronic resource, such as file storage, database storage, cloud storage and the like. Examples of suitable software-based systems (electronic resources) include information systems, computer-aided design (CAD) systems, and the like. Examples of suitable information systems may include data warehouses, resource planning systems, geographic information systems, global information systems, and the like.

More particularly, as shown, the resource host systems may include an image database 102 having a metadata repository 106 therein and a reference database 106. The system and the resource host systems may be coupled by wire or wirelessly, directly or over one or more networks. In some examples, the system and resource host systems may be integrated into a single component configured to perform the operations of the system and resource host system(s). Similarly, in some examples, two or more resource host systems may be integrated into a single component configured to perform the functions of the respective resource host system(s).

The image database 102 may be generally configured to maintain a repository of 2D images (e.g., live video feed or still images) captured by a camera within an environment. In some implementations, the image database 102 may be embodied by the camera itself such that the images are received and processed by the system in real-time.

The metadata repository 104 may be generally configured to maintain metadata associated with the images maintained within the image database 102. In some example implementations, an aircraft vehicle may provide location and orientation data of the camera in the form of metadata. For example, the metadata may be generated by a global positioning system (GPS) or similar positional sensor from a platform on which the camera a mounted or within the camera. In another example, the metadata may be generated by an alternative data and/or sensing systems such as an indoor positioning system (IPS), or generated based at least in part on an estimated location of the camera indicated by manually entered user input. The metadata may be utilized to display where the aircraft vehicle was positioned on a 3D map. The metadata may indicate an estimation of the camera's position in space relative to objects being photographed, and an estimated field of view of the camera.

The reference database 106 may be or include a 3D database of the environment including satellite imagery, an elevation map, and/or other known 3D feature data or 3D content that provide a virtual representation of the real world that is being imaged. In some example implementations, the reference database may be built from the satellite imagery, an elevation map, or any known 3D feature data. In other example implementations, the reference database may be built from alternative imaging sources include computer-aided design (CAD) drawings, rasterized road networks, urban feature(s) data, and the like.

In some example implementations, the camera pose estimation system 100 may be configured to determine camera pose (position and orientation) using pattern matching. A reference 3D model and/or scene may be utilized to render synthetic 2D images that are compared with live 2D image and analyzed to determine points of correlation. Lines of projection may be projected through the points of correlation to determine corresponding 3D locations. The corresponding 2D and 3D points may be utilized by a pose estimation algorithm to determine a new camera position, and the process may be repeated until a predefined error metric has been satisfied.

Figure 2:
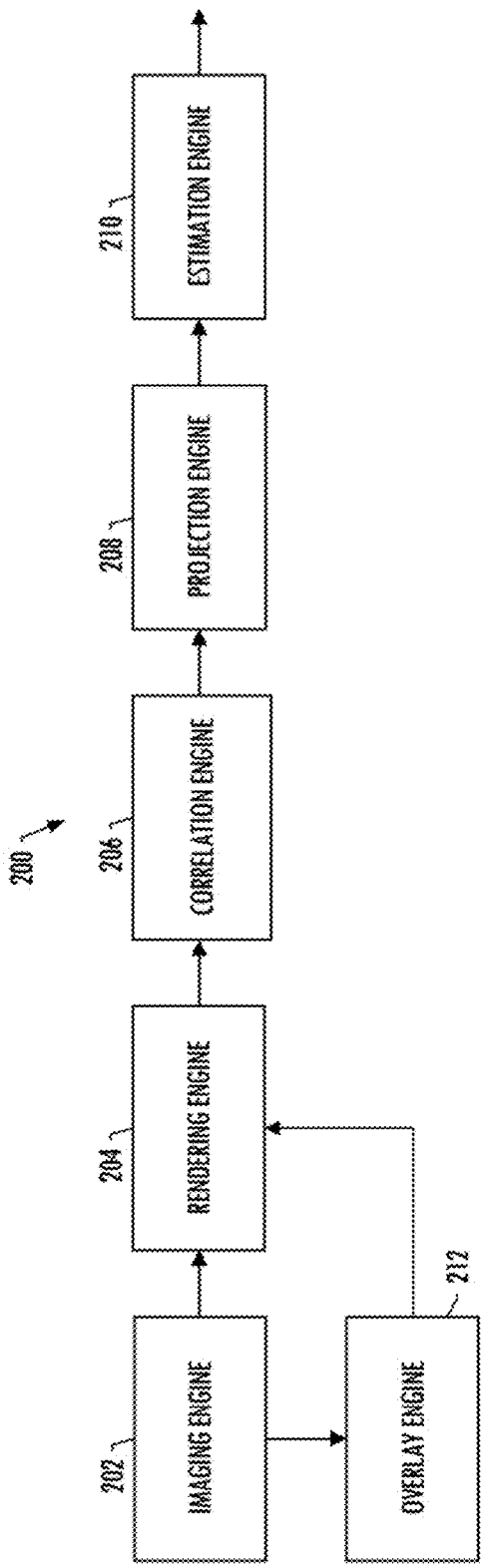
FIGS. 2, 3 and 4 illustrate respectively a pattern-based pose estimation system, optimized pose estimation system, and structure-based pose estimation system, in accordance with example implementations.

FIG. 2 illustrates a more particular example of the pattern-based pose estimation system 200 of the camera pose estimation system 100 of FIG. 1. The pattern-based pose estimation system may include one or more of each of any of a number of different subsystems (each an individual system) for performing one or more functions or operations to estimate the position of a camera using pattern matching. As shown, for example, the pattern-based pose estimation system may include an imaging engine 202, rendering engine 204, correlation engine 206, projection engine 208, estimation engine 210, and/or overlay engine 212. It should be understood that while the respective systems are shown as part of the pattern-based pose estimation system 200, one or more of the respective systems may instead be separate from but in communication with the pattern-based pose estimation system or even the optimized pose estimation system 300 and structure-based pose estimation system 400. Further, it should be understood that one or more of the subsystems may function or operate as a separate system without regard to others of the subsystems. And it should be understood that the pattern-based estimation system may include one or more additional or alternative subsystems than those shown in FIG. 2.

The imaging engine 202 may be configured to receive a two-dimensional (2D) image captured at a particular time by a camera within an environment. The 2D image may have corresponding metadata with structured information that indicates an estimated position of the camera within the environment at the particular time. The 2D image may include a photograph or a frame of a live video feed. In some example implementations, the imaging engine receiving the 2D image includes being configured to receive the 2D image captured by the camera mounted onto an unmanned aerial vehicle (UAV).

Figure 5:
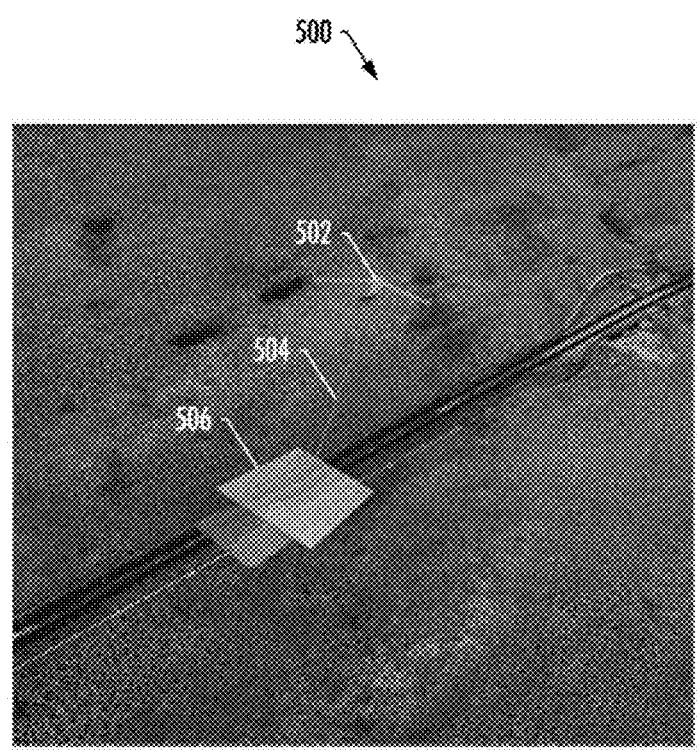
FIGS. 5-7 illustrate example visualizations rendered by the camera pose estimation system of FIG. 1.

The rendering engine 204 may be configured to interpret the metadata to identify the estimated position of the camera, and render a synthetic 2D image from a three-dimensional (3D) model of the environment. The 3D model may include, for example, satellite imagery, an elevation map, and/or other known 3D feature data or 3D content such that the content of the synthetic 2D image may be comprised of a plurality of best-known historical content including, but not limited to, an elevation mesh, satellite textures, approximate building shapes, other 3D objects, and the like. FIG. 5 illustrates an example 3D model 500. The synthetic 2D image may be rendered by a synthetic camera within the 3D model at the estimated position. In some example implementations, in which the camera may be mounted onto an unmanned aerial vehicle (UAV), the rendering engine may be configured to render the synthetic 2D image by a synthetic UAV 502 within the 3D model (e.g., 3D model 500) including the synthetic camera at the estimated position. As shown in FIG. 5, for example, in some implementations the overlay engine 212 may be configured to overlay at least the 2D image in which the 2D image may indicate a live view of a camera of the UAV.

The correlation engine 206 may be configured to correlate the 2D image and synthetic 2D image to identify a 2D point on the synthetic 2D image that is a point of correlation. In some example implementations, the point of correlation includes a point on an object depicted in both the 2D image and the synthetic 2D image. The correlation engine may be configured to compare the 2D image and the synthetic 2D image. Using the comparison, the correlation engine may identify the point of correlation based on a scale-invariant feature transform (SIFT) algorithm, speeded up robust features (SURF) algorithm, pattern matching algorithm, or optical flow algorithm. It should be noted that the correlation engine may also identify the point of correlation based on one or more additional algorithms not explicitly stated herein.

In some example implementations, pattern matching and/or comparisons between the captured 2D image and the synthetic 2D image to identify a point of correlation may include identifying one or more points of correlation between images that may be generated using different imaging devices. For example, the synthetic 2D image may be generated within a visual color spectrum, and the captured 2D image may be generated within an infrared.

In some example implementations, the correlation engine 206 may be configured to identify a plurality of 2D points on the synthetic 2D image that have at least a threshold degree of accuracy with respective corresponding 2D points on the 2D image. The plurality of 2D point may thereby be a plurality of points of correlation. As such, the correlation engine may be configured to identify any 2D point of correlation between images such that subsequent calculation may know require knowledge of a specific feature from a first image that has a corresponding feature in a second image, and may only require knowledge of any point in the first image that has a corresponding point in the second image.

As shown in FIG. 5, the projection engine 208 may be configured to project a line 504 from the synthetic camera and through the 2D point on the synthetic 2D image rendered in an image plane of the synthetic camera such that the line intersects the 3D model at a corresponding 3D point therein. In some example implementations, the projection engine may be configured to project a respective plurality of lines from the synthetic camera and through a plurality of 2D points identified by the correlation engine. The respective plurality of lines may intersect the 3D model at a corresponding plurality of 3D points therein.

The estimation engine 210 may then be configured to determine a refined position of the camera at the particular time, based at least in part on the 2D point and corresponding 3D point. In some example implementations, the estimation engine may be configured determine the refined position of the camera based at least in part on a plurality of 2D points identified by the correlation engine and corresponding plurality of 3D points identified by the projection engine, according to at least one of a pose from an orthography and scaling with iterations (POSIT) algorithm, or a direct linear transformation algorithm. It should be noted that the estimation engine may also determine the refined position of the camera according to one or more additional algorithms not explicitly stated herein. In some example implementations, the pattern-based pose estimation system 200 may be configured to generate a list of each 2D point and corresponding 3D point, and communicate the list to a secondary system (e.g., optimized pose estimation system 300) for determining the refined position based at least in part on the list of each 2D point and corresponding 3D point.

Figure 3:
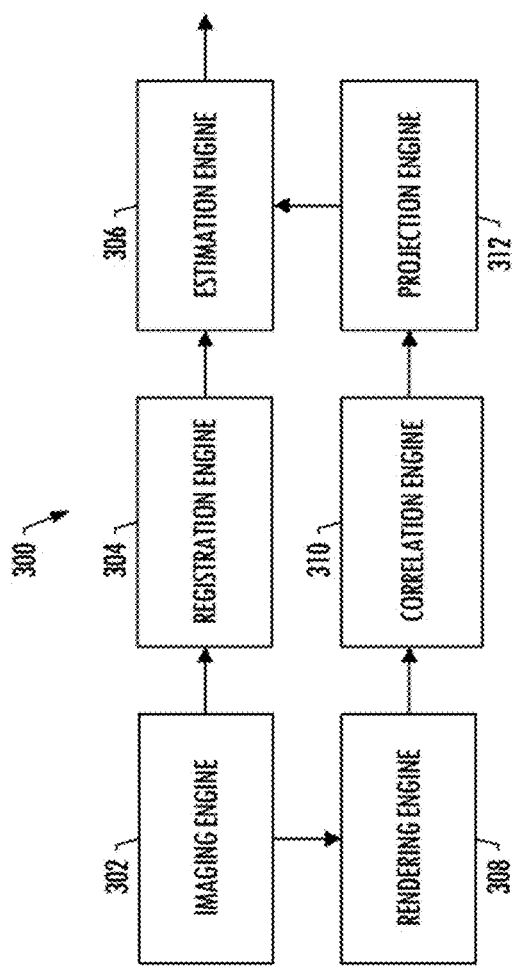

In some example implementations, the camera pose estimation system 100 may be configured to determine a camera pose (position and orientation) using optimized pose refinement. FIG. 3 illustrates a more particular example of the optimized pose estimation system 300 of the camera pose estimation system 100 of FIG. 1. The optimized pose estimation system may include one or more of each of any of a number of different subsystems (each an individual system) for performing one or more functions or operations to estimate the position of a camera using pattern matching. As shown, for example, the optimized pose estimation system may include an imaging engine 302, registration engine 304, and estimation engine 306, rendering engine 308, correlation engine 310, and projection engine 312.

It should be understood that while the respective systems are shown as part of the optimized pose estimation system 300, one or more of the respective systems may instead be separate from but in communication with the optimized pose estimation system or even the pattern-based pose estimation system 200 and structure-based pose estimation system 400. Further, it should be understood that one or more of the subsystems may function or operate as a separate system without regard to others of the subsystems. And it should be understood that the optimized estimation system may include one or more additional or alternative subsystems than those shown in FIG. 3.

The imaging engine 302 may be configured to receive a two-dimensional (2D) image captured at a particular time by a camera within an environment. In some example implementations, the imaging engine 302 may be or include the imaging engine 202 of FIG. 2. The 2D image may have corresponding metadata with structured information that indicates an estimated position of the camera within the environment at the particular time. The 2D image may include a photograph or a frame of a live video feed.

The registration engine 304 may be configured to interpret the metadata to identify the estimated position of the camera, and register the 2D image within the 3D model (e.g., 3D model 500) of the environment based thereon. The 2D image may be rendered in an image plane 506 of a synthetic camera within the 3D model at the estimated position.

The estimation engine 306 may be configured to identify a 2D point on the 2D image and a corresponding 3D point in the 3D model. For example, the estimation engine may identify a known point in the environment such as a ground point that is a 3D location (e.g., latitude, longitude, altitude coordinates) that may be converted into a point in a rectangular space, and resultantly be a 2D point within the 2D image. In some implementations, each 3D point within the model may be converted to the same 2D reference frame. In some example implementations, the estimation engine 306 may be or include the estimation engine 210 of FIG. 2. While infinite corresponding 3D and 2D points may exist within the 3D model, in some example implementations, a 3D point may be identified because of a predefined priority and/or confidence level associated with the point. In alternative implementations, a 3D point may be identified based on a respective proximity to the center of the 2D image or an object of interest within the 2D image.

The estimation engine may reposition the synthetic camera (e.g., UAV 502 having a synthetic camera therein) and thereby the image plane 506 and 2D image to a new position of the synthetic camera at which a projection line 504 from the synthetic camera and through the 2D point intersects the corresponding 3D point. The estimation engine may output the new position of the synthetic camera as a refined position of the camera at the particular time. In an alternative implementation, the estimation engine may position the synthetic camera within a fixed position and reposition the 3D model until the projection line from the synthetic camera and through the corresponding 2D point intersects the corresponding 3D point.

In some example implementations, a component of the estimated position of the camera has an amount of error attributable to a source of the estimated position, and the estimation engine 306 may be configured to reposition the synthetic camera by adjusting the component and thereby reducing the amount of error. For example, if compass and orientation sensors of an aircraft vehicle are highly accurate, but the GPS has a low accuracy, the system may determine that the estimated orientation is correct and reposition the synthetic camera in the x-direction, y-direction, and z-direction only. In some implementations, the synthetic camera may be repositioned in predefined increments to minimize the amount the each repositioning is varied from the estimate. The refined camera position may be one of an infinite number of camera positions that would allow the 3D point to intersect the image plane at the corresponding 2D point, but the estimated position may provide a reasonable estimate given the known sources of error in the initial camera position estimate.

In some example implementations, the estimation engine 306 may be configured to further identify a second 2D point on the 2D image that has a different, second corresponding 3D point in the 3D model. For example, the estimation engine may identify a second known point in the environment that has a different, second corresponding 3D point in the 3D model, and a different, second corresponding 2D point on the 2D image. In these example implementations, the estimation engine may reposition the synthetic camera by repositioning the synthetic camera to the new position of the synthetic camera further at which a second projection line from the synthetic camera and through the second 2D point intersects the second corresponding 3D point.

Also in these example implementations, the estimation engine 306 may be configured to reposition the synthetic camera by repositioning the synthetic camera to an intermediate position at which the projection line from the synthetic camera and through the 2D point intersects the corresponding 3D point and is thereby constrained. The estimation engine may then reposition the synthetic camera to the new position further at which the second projection line from the synthetic camera and through the second 2D point intersects the second corresponding 3D point.

In some example implementations, the estimation engine 306 may be configured to reposition the synthetic camera (e.g., UAV 502 having a synthetic camera therein) by producing a projection line 504 from the synthetic camera, through the 2D point and intersecting the corresponding 3D model at an initial 3D point; and for any distance error between the 2D point and corresponding the 3D point, the estimation engine may reposition the synthetic camera and thereby the image plane 506, 2D image and projection line 502 to the new position of the synthetic camera at which the projection line from the synthetic camera and through the 2D point intersects the corresponding 3D point, and thereby reducing the distance error.

In some example implementation, more than two (2) points of correlation may be identified and the estimation engine may be configured to compute and return the distance error between the remaining points of correlation and corresponding 3D points upon constraining the position of the synthetic camera with respect to the first and second point of correlation.

The rendering engine 308 may be configured to render a synthetic 2D image from the 3D model of the environment. In some example implementations, the rendering engine 308 may be or include the rendering engine 204 of FIG. 2. The synthetic 2D image may be rendered by the synthetic camera within the 3D model at the estimated position of the camera The correlation engine 310 may be configured to correlate the 2D image and the synthetic 2D image to identify a 2D point on the synthetic 2D image that is a point of correlation in which the 2D point on the synthetic 2D image being output to the estimation engine 306 that is thereby configured to identify the 2D point on the 2D image. In some example implementations, the correlation engine 310 may be or include the correlation engine 206 of FIG. 2.

The projection engine 312 may be configured to project a line 504 from the synthetic camera and through the 2D point on the synthetic 2D image rendered in the image plane of the synthetic camera. In some example implementations, the projection engine 312 may be or include the projection engine 208 of FIG. 2. The line may intersect the 3D model at a corresponding 3D point therein, and the corresponding 3D point being output to the estimation engine that is thereby configured to identify the corresponding 3D point in the 3D mode.

In some example implementations, the camera pose estimation system 100 may be configured to determine a camera pose (position and orientation) using the basis of inferred structures. Construction and/or building techniques (e.g., level lines, right angle, and the like) from man-made structures may define angular references to be utilized as error constraints for estimating a position of the camera.

Figure 4:
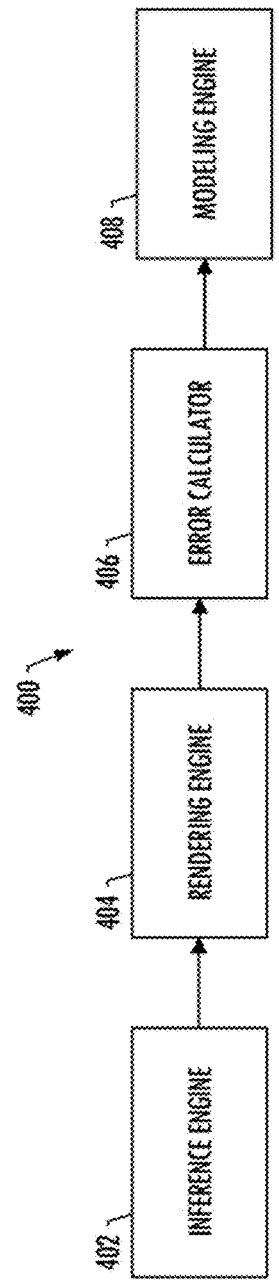

FIG. 4 illustrates a more particular example of the structure-based pose estimation system 400 of the camera pose estimation system 100 of FIG. 1. The structured-based pose estimation system may include one or more of each of any of a number of different subsystems (each an individual system) for performing one or more functions or operations to estimate the position of a camera using inferred structures. As shown, for example, the structure-based pose estimation system may include an inference engine 402, rendering engine 404, error calculator 406, and modeling engine 408.

It should be understood that while the respective systems are shown as part of the structure-based pose estimation system 400, one or more of the respective systems may instead be separate from but in communication with the optimized pose estimation system or even the pattern-based pose estimation system 200 and optimized pose estimation system 300. Further, it should be understood that one or more of the subsystems may function or operate as a separate system without regard to others of the subsystems. And it should be understood that the structure-based pose estimation system may include one or more additions or alternative subsystems than those shown in FIG. 4.

The inference engine 402 may be configured to receive a 2D image of at least a portion of a structure captured by a camera, and produce an annotated 2D image in which a plurality of architecture features of the structure in the 2D image are overlaid with a corresponding plurality of geometric features. In some example implementations, the inference engine may be configured to produce the annotated 2D image by autonomously applying at least one computer vision algorithm (e.g., Hough transform) to extract the corresponding plurality of geometric features from the 2D image. For example, an image of a 2D structure may include visual lines that are known to be parallel, perpendicular, horizontal, vertical, and the like.

Additionally, lines that intersect at an unknown but discrete point may form a 3D frame of reference. For example, grout lines from a perpendicular brick wall may intersect at a building having a vertical corner. The 3D frame of reference may provide a single point with vectors that extend outward from the point in different respective directions.

In some example implementations, the plurality of architectural features and corresponding plurality of geometric features are defined in equal number and spatial relationship. Further, in some example implementations, the plurality of architectural features include one or more corners, edges or faces of the structure, and are defined in number and spatial relationship, and the corresponding plurality of geometric features include respectively one or more points, lines, and closed planes, and are defined in equal number and spatial relationship.

The rendering engine 404 may be configured to position a synthetic camera at a particular position, and by the synthetic camera render a synthetic 2D image of at least a portion of a 3D model of the structure. In some example implementations, the rendering engine may be or include the rendering engine 204 of FIG. 2 and/or the rendering engine 308 of FIG. 3. In each instance in which an amount of error in the particular position of the synthetic camera is greater than a threshold amount of error, the rendering engine may be configured to reposition the synthetic camera and by the synthetic camera rerender the synthetic 2D image, and the error calculator is configured to recalculate the amount of error in the particular position of the synthetic camera.

The error calculator 406 may be configured to calculate an amount of error in the particular position of the synthetic camera based on the annotated 2D image and synthetic 2D image. The calculation may include and/or be based at least in part on a correlation of the corresponding plurality of geometric features in the annotated 2D image, and a second plurality of geometric features of the 3D model of the structure in the synthetic 2D image. In each instance in which the amount of error is greater than a threshold amount of error, the error calculator may be configured to recalculate the amount of error in the particular position of the synthetic camera. In an instance in which the amount of error is no greater than the threshold amount of error, the particular position of the synthetic camera may be output as a refined position of the camera. The new position of the synthetic camera may be preferably output as a refined position of the camera to a rendering engine that can render a 2D image of at least a portion of the 3D model based on the refined position of the camera, to thereby depict a refined 2D image of the 2D model.

It should be noted that in an alternative implementation, the rendering engine 404 may be configured to position a synthetic camera at a fixed position, and by the synthetic camera render a synthetic 2D image of at least a portion of a 3D model of the structure in which an amount of error may be calculated between the corresponding plurality of geometric features in the annotated 2D image, and a second plurality of geometric features of the 3D model of the structure in the synthetic 2D image. In each instance in which the amount of error is greater than a threshold amount of error, the rendering engine 404 may be configured to reposition the 3D model with respect to the fixed position of the synthetic camera based at least in part on a correlation between the corresponding plurality of geometric features in the annotated 2D image, and a second plurality of geometric features of the 3D model of the structure in the synthetic 2D image to thereby minimize the amount of error.

In some example implementations, the threshold amount of error may be based at least in part on a measurement type utilized by the system for calculating the amount of error in the particular position of the synthetic camera, and a predefined accuracy requirement. In one implementation, for example, an amount of error may be calculated for a particular position of the synthetic camera based on a range of accuracy within meters of a position. For example, if the accuracy requirement is 0.5 meters, the threshold amount of error may likewise be 0.5 meters. In another implementation, for example, an amount of error may be calculated for a particular position of the synthetic camera pixel measurement. For example, the threshold amount of error may be based on the resolution of the image, the field of view of the camera, or any number of variables that may alter an accuracy range.

In some example implementations, the error calculator 406 may be configured to calculate the amount of error by registering the synthetic 2D image to align with the annotated 2D image, and calculating an amount of error proportional to an amount of misalignment of the corresponding plurality of geometric features in the annotated 2D image, and the second plurality of geometric features of the 3D model of the structure in the synthetic 2D image.

Figure 6:

The modeling engine 408 may be configured to receive a plurality of 2D images each of which is of at least a portion of the structure, detect a second plurality of architectural features of the structure in the 2D images and extract a corresponding second plurality of geometric features, and produce the 3D model of the structure from the corresponding second plurality of geometric features. In some example implementations, the second plurality of images may be and/or include at least some of the same architectural features and corresponding geometric features produced by the inference engine 402. FIG. 6 illustrates an example produced 3D model 600 of a 2D image 600 in which the 3D model includes structures 602, 604 therein produced by the modeling engine from at least a portion of the structures depicted within the 2D image.

Figure 7:
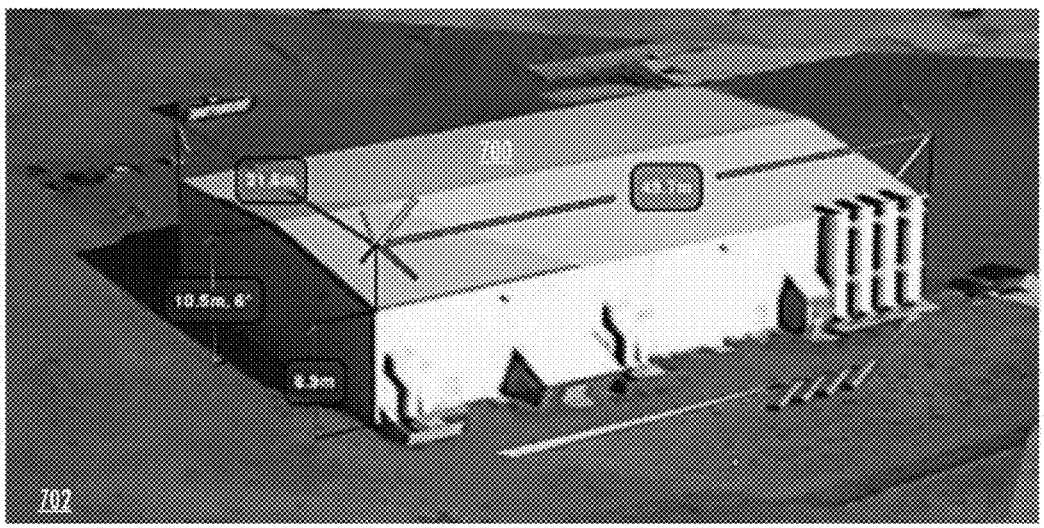

As illustrated in FIG. 7, in some example implementations, at least one of an absolute dimension (e.g., height, width, or depth) of the structure 700 is defined based at least in part on the second plurality of architecture features, and the modeling engine 408 may be configured to display the at least one absolute dimension within the 3D model 702 of the structure.

Figure 8:
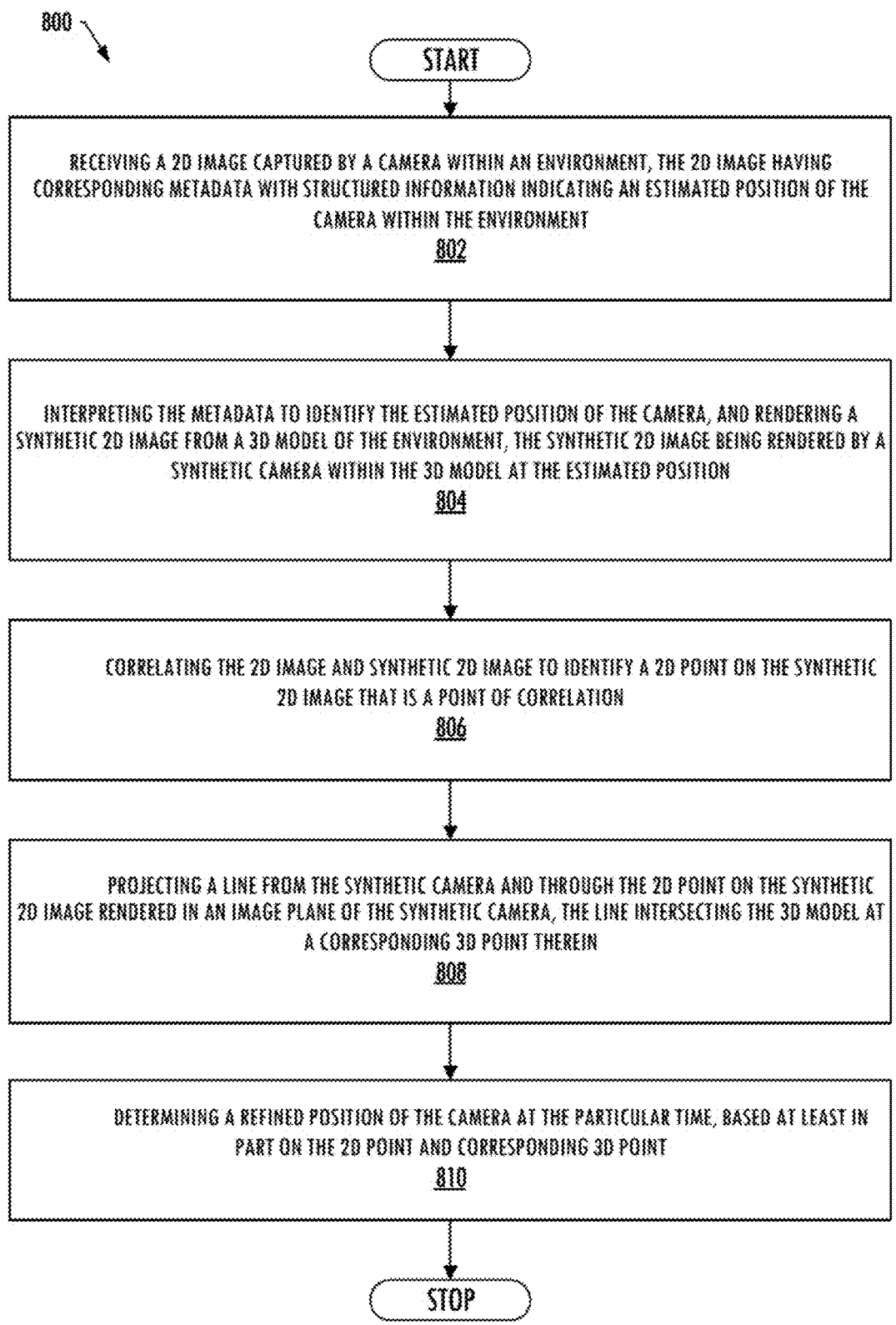
FIG. 8 is a flow diagram illustrating various operations of a method of estimating the position of a camera, in accordance with an example implementation.

FIG. 8 illustrates a flowchart including operations in a method 800 of estimating a position of a camera in an environment in accordance with an example implementation of the present disclosure. As shown at block 802, the method may include receiving a 2D image captured at a particular time by a camera within an environment. The 2D image may have corresponding metadata with structured information indicating an estimated position of the camera within the environment at the particular time. The method may also include interpreting the metadata to identify the estimated position of the camera, and rendering a synthetic 2D image from a 3D model of the environment, as shown at block 804. The synthetic 2D image may be rendered by a synthetic camera within the 3D model at the estimated position. The method may include correlating the 2D image and synthetic 2D image to identify a 2D point on the synthetic 2D image that is a point of correlation, as shown at block 806. The method may include projecting a line from the synthetic camera and through the 2D point on the synthetic 2D image rendered in an image plane of the synthetic camera, as shown at block 808. The line may intersect the 3D model at a corresponding 3D point therein. As shown at block 810, the method may include determining a refined position of the camera at the particular time, based at least in part on the 2D point and corresponding 3D point.

Figure 9:
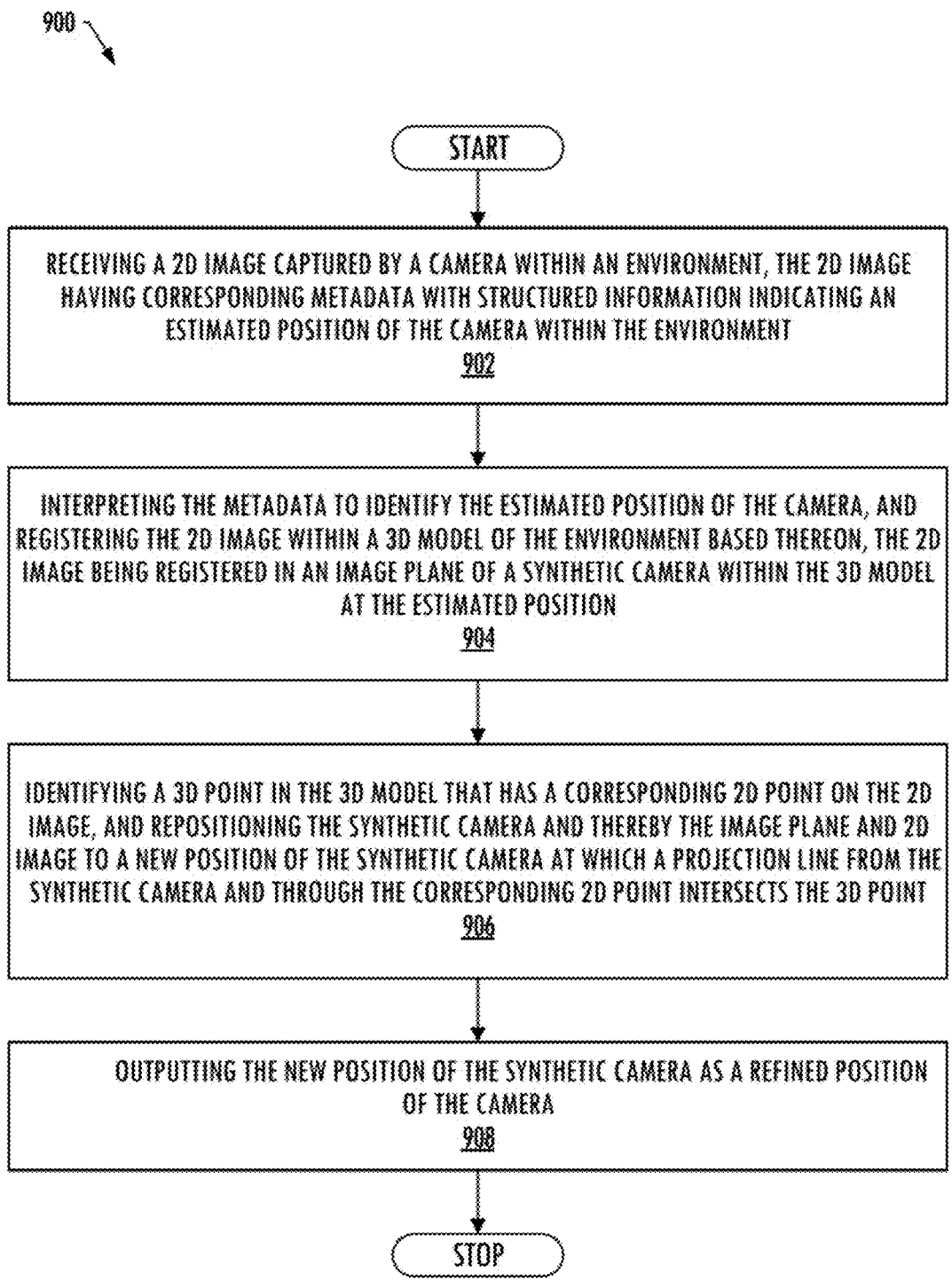
FIG. 9 is a flow diagram illustrating various operations of a method of estimating the position of a camera based on pattern-matching, in accordance with an example implementation.

FIG. 9 illustrates a flowchart including operations in a method 900 of estimating a position of a camera in an environment in accordance with an example implementation of the present disclosure. As shown at block 902, the method may include receiving a 2D image captured at a particular time by a camera within an environment. The 2D image may have corresponding metadata with structured information indicating an estimated position of the camera within the environment at the particular time. The method may also include interpreting the metadata to identify the estimated position of the camera, and registering the 2D image within a 3D model of the environment based thereon, as shown at block 904. The 2D image may be rendered in an image plane of a synthetic camera within the 3D model at the estimated position. The method may also include identifying a 3D point in the 3D model that has a corresponding 2D point on the 2D image, and repositioning the synthetic camera and thereby the image plane and 2D image to a new position of the synthetic camera at which a projection line from the synthetic camera and through the corresponding 2D point intersects The 3D point, as shown at block 906. As shown at block 908, the method may then include outputting the new position of the synthetic camera as a refined position of the camera.

Figure 10:
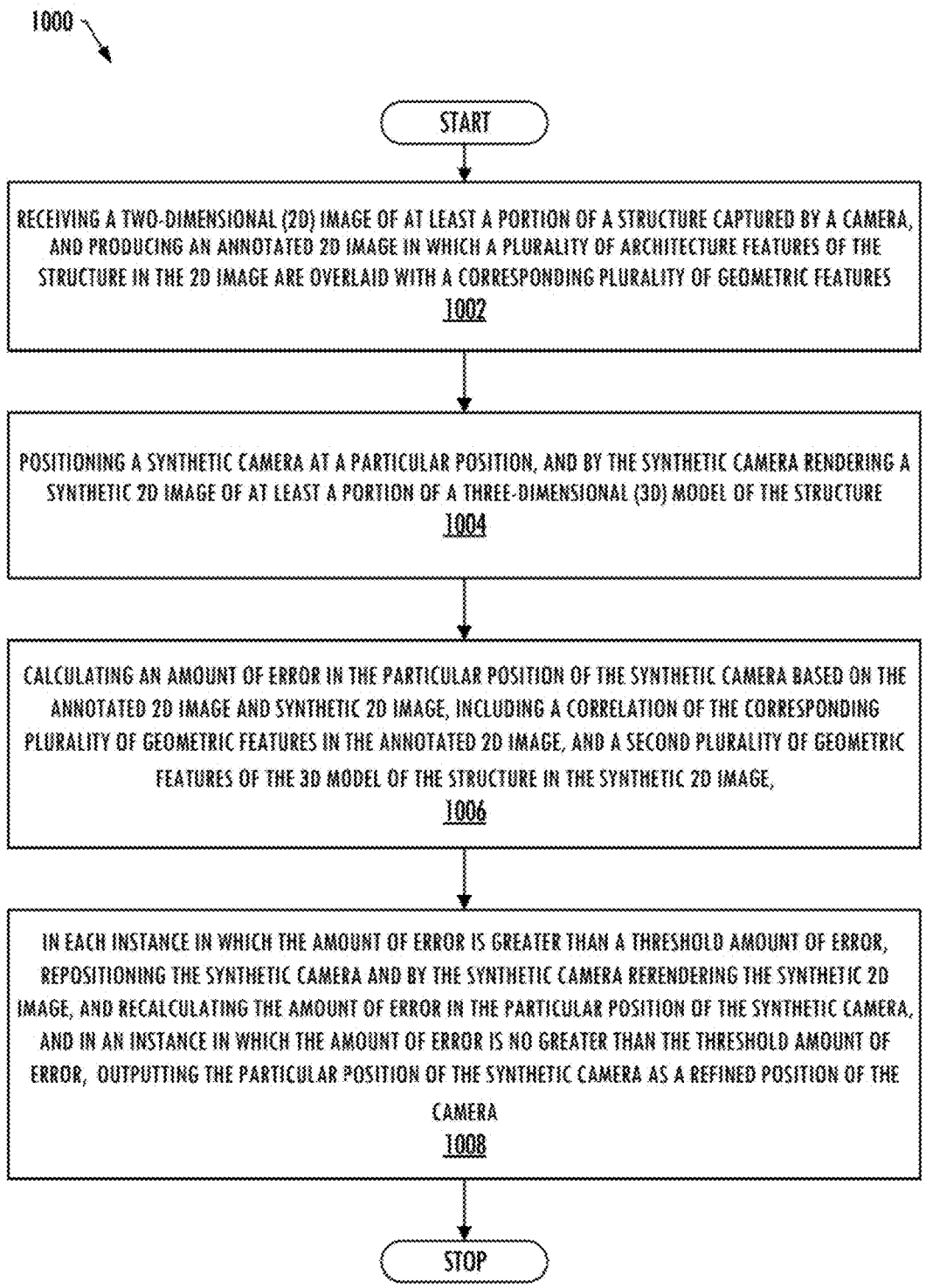
FIG. 10 is a flow diagram illustrating various operations of a method of estimating the position of a camera based on inferred structures, in accordance with an example implementation.

FIG. 10 illustrates a flowchart including operations in a method 1000 of estimating a position of a camera in an environment in accordance with an example implementation of the present disclosure. As shown at block 1002, the method may include receiving a 2D image of at least a portion of a structure captured by a camera, and producing an annotated 2D image in which a plurality of architecture features of the structure in the 2D image are overlaid with a corresponding plurality of geometric features. The method may also comprise positioning a synthetic camera at a particular position, and by the synthetic camera rendering a synthetic 2D image of at least a portion of a 3D model of the structure, as shown at block 1004. The method may also include calculating an amount of error in the particular position of the synthetic camera based on the annotated 2D image and synthetic 2D image, including a correlation of the corresponding plurality of geometric features in the annotated 2D image, and a second plurality of geometric features of the 3D model of the structure in the synthetic 2D image, as shown at block 1006. In each instance in which the amount of error is greater than a threshold amount of error, the method may include repositioning the synthetic camera and by the synthetic camera rerendering the synthetic 2D image, and recalculating the amount of error in the particular position of the synthetic camera, as shown at block 1008. In an instance in which the amount of error is no greater than the threshold amount of error, the method may include outputting the particular position of the synthetic camera as a refined position of the camera, as further shown at block 1008.

According to example implementations of the present disclosure, the system 100 and its subsystems and/or components including the image database 102, metadata repository 104, reference database 106, pattern-based estimation system 200, optimized pose estimation system 300, structure-based estimation system 400 may be implemented by various means. Similarly, the more particular examples of the subsystems 200, 300, and 400 including each of their respective elements may be implemented by various means according to example embodiments. Means for implementing the systems, subsystems and their respective elements may include hardware, alone or under direction of one or more computer programs from a computer-readable storage medium.

In some examples, one or more apparatuses may be provided that are configured to function as or otherwise implement the systems, subsystems, tools and respective elements shown and described herein. In examples involving more than one apparatus, the respective apparatuses may be connected to or otherwise in communication with one another in a number of different manners, such as directly or indirectly via a wired or wireless network or the like.

Figure 11:
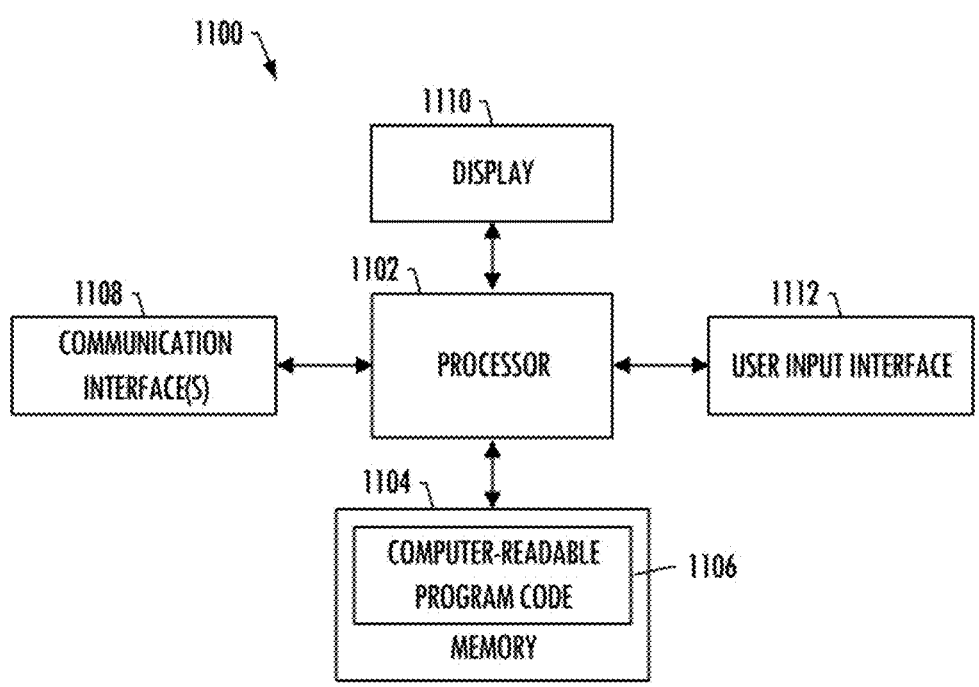
FIG. 11 illustrates an apparatus according to some example implementations.

FIG. 11 illustrates an apparatus 1100 according to some example implementations of the present disclosure. Generally, an apparatus of example implementations of the present disclosure may comprise, include or be embodied in one or more fixed or portable electronic devices. Examples of suitable electronic devices include a smartphone, tablet computer, laptop computer, desktop computer, workstation computer, server computer or the like. The apparatus may include one or more of each of a number of components such as, for example, a processor 1102 (e.g., processor unit) connected to a memory 1104 (e.g., storage device).

The processor 1102 is generally any piece of computer hardware that is capable of processing information such as, for example, data, computer programs and/or other suitable electronic information. The processor is composed of a collection of electronic circuits some of which may be packaged as an integrated circuit or multiple interconnected integrated circuits (an integrated circuit at times more commonly referred to as a "chip"). The processor may be configured to execute computer programs, which may be stored onboard the processor or otherwise stored in the memory 1104 (of the same or another apparatus).

The processor 1102 may be a number of processors, a multi-processor core or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more application-specific integrated circuits (ASICs), field-programmable gate arrays (FPGAs) or the like. Thus, although the processor may be capable of executing a computer program to perform one or more functions, the processor of various examples may be capable of performing one or more functions without the aid of a computer program.

The memory 1104 is generally any piece of computer hardware that is capable of storing information such as, for example, data, computer programs (e.g., computer-readable program code 1106) and/or other suitable information either on a temporary basis and/or a permanent basis. The memory may include volatile and/or non-volatile memory, and may be fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks may include compact disk-read only memory (CD-ROM), compact disk-read/write (CD-R/W), DVD or the like. In various instances, the memory may be referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein may generally refer to a computer-readable storage medium or computer-readable transmission medium.

In addition to the memory 1104, the processor 1102 may also be connected to one or more interfaces for displaying, transmitting and/or receiving information. The interfaces may include a communications interface 1108 (e.g., communications unit) and/or one or more user interfaces. The communications interface may be configured to transmit and/or receive information, such as to and/or from other apparatus(es), network(s) or the like. The communications interface may be configured to transmit and/or receive information by physical (wired) and/or wireless communications links. These wireless communication links in particular may be configured to implement any of a number of different radio access technologies such as any of a number of 3GPP or 4GPP radio access technologies, UMTS UTRA, GSM radio access technologies, CDMA 2000 radio access technologies, WLANs (e.g., IEEE 802.xx, e.g., 802.11a, 802.11b, 802.11g, 802.11n), WiMAX, IEEE 802.16, wireless PANs (WPANs) (e.g., IEEE 802.15, Bluetooth®, low power versions of Bluetooth®, IrDA, UWB, Wibree, Zigbee®), near-field communication technologies, and the like. Examples of suitable communication interfaces include a network interface controller (NIC), wireless NIC (WNIC), infrared interfaces, laser interfaces, light based interfaces, vibration interfaces, other wireless forms of data transmissions, body area networks, local area networks, conductors embodied by a human body, or the like.

The user interfaces may include a display 1110 and/or one or more user input interfaces 1112 (e.g., input/output unit). The display may be configured to present or otherwise display information to a user (technician), and in some examples may include the display device of a wearable (e.g., head-mounted) or handheld personal display system. Examples of suitable personal display systems may include private, private-shared (linked private) or public personal display systems such as those provided in the form of eyeglasses, safety goggles, contact lenses and the like, image projectors, video projectors, any of a number of other active or passive display systems, laser pointers and the like. In other examples, the display device may include a more conventional display device such as a liquid crystal display (LCD), light-emitting diode display (LED), plasma display panel (PDP) or the like, which may or may not take the form of a personal display system (e.g., smartphone, tablet computer).

The user input interfaces 1112 may be wired or wireless, and may be configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces may further include one or more interfaces for communicating with peripherals such as printers, scanners or the like.

As indicated above, program code instructions may be stored in memory, and executed by a processor, to implement functions of the systems, subsystems, tools and their respective elements described herein. As will be appreciated, any suitable program code instructions may be loaded onto a computer or other programmable apparatus from a computer-readable storage medium to produce a particular machine, such that the particular machine becomes a means for implementing the functions specified herein. These program code instructions may also be stored in a computer-readable storage medium that can direct a computer, a processor or other programmable apparatus to function in a particular manner to thereby generate a particular machine or particular article of manufacture. The instructions stored in the computer-readable storage medium may produce an article of manufacture, where the article of manufacture becomes a means for implementing functions described herein. The program code instructions may be retrieved from a computer-readable storage medium and loaded into a computer, processor or other programmable apparatus to configure the computer, processor or other programmable apparatus to execute operations to be performed on or by the computer, processor or other programmable apparatus.

Retrieval, loading and execution of the program code instructions may be performed sequentially such that one instruction is retrieved, loaded and executed at a time. In some example implementations, retrieval, loading and/or execution may be performed in parallel such that multiple instructions are retrieved, loaded, and/or executed together. Execution of the program code instructions may produce a computer-implemented process such that the instructions executed by the computer, processor or other programmable apparatus provide operations for implementing functions described herein.

Execution of instructions by a processor, or storage of instructions in a computer-readable storage medium, supports combinations of operations for performing the specified functions. In this manner, an apparatus 1100 may include a processor 1102 and a computer-readable storage medium or memory 1104 coupled to the processor, where the processor is configured to execute computer-readable program code 1106 stored in the memory. It will also be understood that one or more functions, and combinations of functions, may be implemented by special purpose hardware-based computer systems and/or processors which perform the specified functions, or combinations of special purpose hardware and program code instructions.

Many modifications and other implementations of the disclosure set forth herein will come to mind to one skilled in the art to which the disclosure pertains having the benefit of the teachings presented in the foregoing description and the associated drawings. Therefore, it is to be understood that the disclosure is not to be limited to the specific implementations disclosed and that modifications and other implementations are intended to be included within the scope of the appended claims. Moreover, although the foregoing description and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. An apparatus for estimating a position of a camera within an environment, the apparatus comprising a processor and a memory storing executable instructions that, in response to execution by the processor, cause the apparatus to implement at least:
an imaging engine configured to receive a two-dimensional (2D) image captured by a camera within an environment, the 2D image having corresponding metadata with structured information indicating an estimated position of the camera within the environment;
a rendering engine configured to interpret the metadata to identify the estimated position of the camera, and render a synthetic 2D image from a three-dimensional (3D) model of the environment, the synthetic 2D image being rendered by a synthetic camera within the 3D model at the estimated position of the camera within the environment as indicated by the metadata;
a correlation engine configured to correlate the 2D image and synthetic 2D image to identify a 2D point on the synthetic 2D image that is a point of correlation to a corresponding 3D point in the 3D model;
a projection engine configured project a line from the synthetic camera and through the 2D point on the synthetic 2D image rendered in an image plane of the synthetic camera, where the projected line intersects the 3D model at the corresponding 3D point therein; and
an estimation engine configured to determine a refined position of the camera, based at least in part on the 2D point and corresponding 3D point, including the estimation engine being configured to reposition the synthetic camera to a new position of the synthetic camera at which a projection line from the synthetic camera through the 2D point intersects the corresponding 3D point, and output the new position of the synthetic camera as the refined position of the camera.

2. The apparatus of claim 1, wherein the point of correlation includes a point on an object depicted in the 2D image and the synthetic 2D image, and the correlation engine being configured to correlate the 2D image and synthetic 2D image includes being configured to compare the 2D image and the synthetic 2D image, and using the comparison, identify the point of correlation based on a scale-invariant feature transform (SIFT) algorithm, speeded up robust features (SURF) algorithm, pattern matching algorithm, or optical flow algorithm.

3. The apparatus of claim 1, wherein the correlation engine being configured to correlate the 2D image and synthetic 2D image includes being configured to identify a plurality of 2D points on the synthetic 2D image that have at least a threshold degree of accuracy with respective corresponding 2D points on the 2D image, and that are thereby a plurality of points of correlation, and
wherein the projection engine being configured to project the line includes being configured to project a respective plurality of lines from the synthetic camera and through the plurality of 2D points, the respective plurality of lines intersecting the 3D model at a corresponding plurality of 3D points therein.

4. The apparatus of claim 3, wherein the estimation engine being configured determine the refined position of the camera includes being configured to determine the refined position of the camera based at least in part on the plurality of 2D points and corresponding plurality of 3D points, according to at least one of a pose from an orthography and scaling with iterations (POSIT) algorithm, or a direct linear transformation algorithm.

5. The apparatus of claim 1, wherein the imaging engine being configured to receive the 2D image includes being configured to receive the 2D image captured by the camera mounted onto an unmanned aerial vehicle (UAV), and the rendering engine being configured to render the synthetic 2D image includes being configured to render the synthetic 2D image by a synthetic UAV within the 3D model and including the synthetic camera.

6. The apparatus of claim 1, wherein the 2D image includes a photograph or a frame of a live video feed, and the 3D model includes at least satellite imagery, an elevation map, or 3D feature data.

7. The apparatus of claim 1, further comprising an overlay engine configured to overlay the 2D image onto at least a portion of the 3D model.

8. A method for estimating a position of a camera within an environment, the method comprising:

receiving a two-dimensional (2D) image captured by a camera within an environment, the 2D image having corresponding metadata with structured information indicating an estimated position of the camera within the environment;

interpreting the metadata to identify the estimated position of the camera, and rendering a synthetic 2D image from a three-dimensional (3D) model of the environment, the synthetic 2D image being rendered by a synthetic camera within the 3D model at the estimated position of the camera within the environment as indicated by the metadata;

correlating the 2D image and synthetic 2D image to identify a 2D point on the synthetic 2D image that is a point of correlation to a corresponding 3D point in the 3D model;

projecting a line from the synthetic camera and through the 2D point on the synthetic 2D image rendered in an image plane of the synthetic camera, where the projected line intersects the 3D model at the corresponding 3D point therein; and determining a refined position of the camera, based at least in part on the 2D point and corresponding 3D point, including repositioning the synthetic camera to a new position of the synthetic camera at which a projection line from the synthetic camera through the 2D point intersects the corresponding 3D point, and outputting the new position of the synthetic camera as the refined position of the camera.

9. The method of claim 8, wherein the point of correlation includes a point on an object depicted in the 2D image and the synthetic 2D image, and correlating the 2D image and synthetic 2D image includes comparing the 2D image and the synthetic 2D image, and using the comparison, identifying the point of correlation based on a scale-invariant feature transform (SIFT) algorithm, speeded up robust features (SURF) algorithm, pattern matching algorithm, or optical flow algorithm.

10. The method of claim 8, wherein correlating the 2D image and synthetic 2D image includes identifying a plurality of 2D points on the synthetic 2D image that have at least a threshold degree of accuracy with respective corresponding 2D points on the 2D image, and that are thereby a plurality of points of correlation, and wherein projecting the line includes projecting a respective plurality of lines from the synthetic camera and through the plurality of 2D points, the respective plurality of lines intersecting the 3D model at a corresponding plurality of 3D points therein.

11. The method of claim 10, wherein determining the refined position of the camera includes determining the refined position of the camera based at least in part on the plurality of 2D points and corresponding plurality of 3D points, according to at least one of a pose from an orthography and scaling with iterations (POSIT) algorithm, or a direct linear transformation algorithm.

12. The method of claim 8, wherein receiving the 2D image includes receiving the 2D image captured by the camera mounted onto an unmanned aerial vehicle (UAV), and rendering the synthetic 2D image includes rendering the synthetic 2D image by a synthetic UAV within the 3D model and including the synthetic camera.

13. The method of claim 8, wherein the 2D image includes a photograph or a frame of a live video feed, and the 3D model includes at least satellite imagery, an elevation map, or 3D feature data.

14. The method of claim 8, further comprising overlaying the 2D image onto at least a portion of the 3D model.

15. A computer-readable storage medium for estimating a position of a camera within an environment, the computer-readable medium having computer-readable program code stored therein that, in response to execution by a processor, cause an apparatus to at least:

receive a two-dimensional (2D) image captured by a camera within an environment, the 2D image having corresponding metadata with structured information indicating an estimated position of the camera within the environment;

interpret the metadata to identify the estimated position of the camera, and rendering a synthetic 2D image from a three-dimensional (3D) model of the environment, the synthetic 2D image being rendered by a synthetic camera within the 3D model at the estimated position of the camera within the environment as indicated by the metadata;

correlate the 2D image and synthetic 2D image to identify a 2D point on the synthetic 2D image that is a point of correlation to a corresponding 3D point in the 3D model;

project a line from the synthetic camera and through the 2D point on the synthetic 2D image rendered in an image plane of the synthetic camera, where the projected line intersects the 3D model at a corresponding 3D point therein; and determine a refined position of the camera, based at least in part on the 2D point and corresponding 3D point, including the apparatus being caused to reposition the synthetic camera to a new position of the synthetic camera at which a projection line from the synthetic camera through the 2D point intersects the corresponding 3D point, and output the new position of the synthetic camera as the refined position of the camera.

16. The computer-readable storage medium of claim 15, wherein the point of correlation includes a point on an object depicted in the 2D image and the synthetic 2D image, and the apparatus being caused to correlate the 2D image and synthetic 2D image includes being caused to compare the 2D image and the synthetic 2D image, and using the comparison, identify the point of correlation based on a scale-invariant feature transform (SIFT) algorithm, speeded up robust features (SURF) algorithm, pattern matching algorithm, or optical flow algorithm.

17. The computer-readable storage medium of claim 15, wherein the apparatus being caused to correlate the 2D image and synthetic 2D image includes being caused to identify a plurality of 2D points on the synthetic 2D image that have at least a threshold degree of accuracy with respective corresponding 2D points on the 2D image, and that are thereby a plurality of points of correlation, and wherein the apparatus being caused to project the line includes being caused to project a respective plurality of lines from the synthetic camera and through the plurality of 2D points, the respective plurality of lines intersecting the 3D model at a corresponding plurality of 3D points therein.

18. The computer-readable storage medium of claim 17, wherein the apparatus being caused to determine the refined position of the camera includes being caused to determine the refined position of the camera based at least in part on the plurality of 2D points and corresponding plurality of 3D points, according to at least one of a pose from an orthography and scaling with iterations (POSIT) algorithm, or a direct linear transformation algorithm.

19. The computer-readable storage medium of claim 15, wherein the apparatus being caused to receive the 2D image includes being caused to receive the 2D image captured by the camera mounted onto an unmanned aerial vehicle (UAV), and the apparatus being caused to render the synthetic 2D image includes being caused to render the synthetic 2D image by a synthetic UAV within the 3D model and including the synthetic camera.

20. The computer-readable storage medium of claim 15, wherein the 2D image includes a photograph or a frame of a live video feed, and the 3D model includes at least satellite imagery, an elevation map, or 3D feature data.

21. The computer-readable storage medium of claim 15, further comprising computer-readable program code stored therein that, in response to execution by a processor, cause an apparatus to at least overlay the 2D image onto at least a portion of the 3D model.

* * * * *